2,830,925

GLASS FIBER LAMINATES AND PROCESS OF MANUFACTURE

John D. Fennebresque, Oyster Bay Cove, N. Y., and Irving E. Muskat, Plainfield, N. J., assignors to Celanese Corporation of America, New York, N. Y., a corporation of Delaware No Drawing. Application February 24, 1954
Serial No. 412,377

9 Claims. (Cl. 154—128)

This invention relates to plastic laminates and relates more particularly to plastic laminates having a superior decorative appearance.

This application is a continuation-in-part of application Ser. No. 382,200, filed September 24, 1953, now abandoned.

A form of plastic laminate that has come into widespread use is prepared by impregnating a fibrous material, particularly a glass fiber material, with a polymerizable resin composition and effecting the polymerization of the resin composition, usually with the aid of pressure, and, if desired, heat. The product prepared in this manner is light and strong and may be employed for many purposes. In some cases it is desirable to color the plastic laminate and to this end it has been proposed to incorporate a coloring material into the resin composition before applying the same to the fibrous material. When this is done it is found that the laminate is not completely uniform in appearance owing, primarily, to variations in the thicknes of the laminate so that different portions of the laminate contain different amounts of resin and coloring material. Other problems that are encountered when incorporating a coloring material into the resin arise from the tendency of certain coloring materials to effect the stability and alter the rate of polymerization of the resin and also, from the difficulty of duplicating the color as between different batches of resin. The incorporation of the coloring material into the resin is useful when it is desired to distribute the coloring material throughout the entire laminate. However, it does not readily permit the coloring material to be incorporated into the laminate in such a manner as to produce a design.

It is an important object of the present invention to provide a plastic laminate which will be free from the foregoing and other difficulties.

A further object of this invention is to provide a plastic laminate having a superior decorative appearance.

Other objects of this invention will be apparent from the following detailed description and claims.

According to the present invention, a plastic laminate having a superior decorative appearance is produced by incorporating into the said laminate a pigmented fibrous material. The pigmented fibrous material may be applied uniformly to one or more surfaces of the plastic laminate and, when so applied, will impart to the said laminate a uniform overall color free from the irregularities that are encountered when a coloring material is incorporated into the resin. The pigmented fibrous material may also be applied to the plastic laminate to produce a design of any desired appearance, as, for example, by applying the pigmented fibrous material only to selected portions of the laminate, or by applying pigmented fibrous materials of more than one color to the plastic laminate, or both. It is also possible, when a pigmented fibrous material is incorporated into the plastic laminate, to incorporate a coloring material into the resin to produce a product having a unique decorative appearance. While, in this case, there will be a certain degree of irregularity in the different areas of the laminate, this may not be objectionable for certain applications especially since the color of the resin will blend with that of the pigmented fibrous material.

The use of the pigmented fibrous material in the plastic laminate not only eliminates the variations in color that result from the incorporation of the coloring material into the resin, but it also possesses a number of other advantages. Thus, the use of the pigmented fibrous material enables the color of the plastic laminates to be readily duplicated. This is of great importance, especially when it is desired to match a specific color after a long period of time has elapsed since a plastic laminate of the said color was last produced. The coloring materials in the pigmented fibrous material are of good fastness to light and heat so that they will retain their colors substantially unchanged even when they are employed in locations where they are exposed to the effect of such agencies. The pigmented fibrous materials have substantially no effect on the rate of polymerization of the resin so that no allowance must be made in this regard for their use. Furthermore, the colors in the pigmented fibrous materials are not altered by the conditions employed during the polymerization of the resin. The pigmented fibrous materials are also easily wet by the resin so that the resin will adhere thereto strongly in the plastic laminate.

There is some tendency, when a fibrous material containing heavy or stiff fibers is impregnated with a resin, for individual fibers to project through the surface of the resin. This effect is noted, for example, when a mat or batting of glass fibers is impregnated with a polymerizable resin composition and the resin polymerized. These projecting fibers impair the weatherability of the plastic laminate in that they act as foci for the weathering attack to begin. By employing a pigmented fibrous material, the fibers of which are light, flexible, thermoplastic or otherwise capable of being readily deformed by the pressure employed during the moulding step, and applying said pigmented fibrous material to the surface of the fibrous material whose fibers would otherwise project from the surface of the plastic laminate it is possible to eliminate completely the projecting fibers. The weatherability of the plastic laminates is thereby greatly enhanced. In addition, the apearance and surface smoothness of said laminates is improved.

The pigmented fibrous material may have a basis of any suitable fiber-forming material. For example, the fiber-forming material may comprise an organic acid ester of cellulose such as cellulose acetate, cellulose propionate, cellulose acetate propionate, cellulose butyrate or cellulose acetate butyrate, a cellulose ether, a polyamide, a polyester, a polyurethane, a polyaminotriazole, a polyacrylonitrile, a copolymer of acrylonitrile and another polymerizable material, a polymer or copolymer of vinylidene chloride, a protein derived from animal or vegetable sources, or regenerated cellulose whether prepared by the viscose or cuprammonium process or by the saponification of a cellulose ester. The pigment may be incorporated into the fiber-forming material at any desired point in the manufacture of the fibrous material. Thus, the pigment may be incorporated into a solution of the fiber-forming material which is to be spun by a dry-spinning or wet-spinning process to produce a fiber. The pigment may also be injected directly into the spinning solution immediately prior to the spinning step. Where a melt-spinning process is employed for producing a fibrous material, the pigment may be incorporated into the fiber-forming material during its manufacture or at any subsequent point in its processing.

In addition to containing the pigment the fibrous material may contain or have applied thereto other substances to improve its properties and those of the plastic laminates containing the same. Thus, there may be applied to said fibrous materials fire-retardants, ulta-violet light absorbents, plasticizers and the like. The incorporation of fire-retardants into the fibrous material renders the entire plastic laminate fire resistant and is, therefore, highly desirable. There may also be applied to said fibrous materials substances capable of improving the adhesion of the resin to said materials, such as silicones, polyamide resins and the like.

The pigmented fibrous material may be in the form of fibers of indefinite length or fibers of staple length or in the form of a yarn of fibers of indefinite length or staple length and may be employed in the form of mats or battings comprising a plurality of fibers of one or more types and containing pigments of one or more colors. For some applications, it may be desirable to treat the mats so as to cause at least a portion of the fibers to adhere to one another to give the mats a coherent structure. When the mats contain at least some fibers that are thermoplastic, such adherence may be readily achieved by softening the thermoplastic fibers, as by the application of heat, a softening agent, or the like. The fibers may also be caused to adhere to one another through any other means, as by the use of an adhesive composition or the like. Such mats may be incorporated into one or more of the surfaces of the plastic laminate, depending upon the effects it is desired to achieve in the final product. The pigmented fibrous material may also be employed in the form of a fabric which may be of a single color or which may contain fibers of several colors. However, the pigmented fibrous material may be incorporated into the plastic laminate in other ways. For example, individual yarns of pigmented fibrous material may be arranged parallel to one another and incorporated as groups into the plastic laminate. By having these groups of yarns intersect one another and by employing groups of yarns of different color and containing different numbers of yarns it is possible to produce a plaid effect. Other decorative effects that may be achieved through the use of pigmented fibrous material will be apparent to those skilled in the art.

While the pigmented fibrous material may be the sole fibrous material in the plastic laminate it is usually employed simply as a surfacing layer on a different unpigmented fibrous material which comprises the major portion of the fibrous material in the plastic laminate and imparts thereto the desired physical properties such as strength, rigidity and the like. These other fibrous material may comprise woven or felted glass fiber, or woven or felted natural fibers such as cotton, wool, linen, sisal and the like or woven or felted synthetic fibers including those set forth specifically above.

The resinous material which may be used in accordance with the present invention may be either thermosetting or thermoplastic materials, either in their molten state or natural liquid state. The invention, however, particularly lends itself for use with polymerizable materials, especially those in their natural liquid state. Thus, for example, the resinous material may be a monomer or partial polymer in its natural liquid state, such as styrene and methylmethacrylate, or liquefied thermoplastic materials such as liquefied polymerized styrene and methylmethacrylate, or condensible materials such as mono- and di-methylolureas or melamine and formaldehyde. It may also be an inter-polymer of mono-functional, polymerizable materials, such as the inter-polymers of diethyl maleate, diethyl fumarate, dimethyl maleate or dimethyl fumarate with vinyl chloride, vinyl acetate or styrene, or it may be a co-polymer of vinyl chloride and vinyl acetate.

Particularly useful polymerizable liquids for use in accordance with the present invention are the polyfunctional, oxygen-convertible esters of unsaturated dibasic acids such as maleic, fumaric, itaconic or citraconic acids or acetylene dicarboxylic acid and a polyhydric alcohol, particularly dihydric alcohols, including ethylene glycol, propylene glycol, isobutylene glycol, 1,3-trimethylene glycol, hexamethylene glycol, glycerol, methyl glycerol, phthalyl, alcohol or polyhydroxy polymers of these alcohols, such as diethylene glycol, triethylene glycol, tetraethylene glycol, dipropylene glycol, polyglycerol, etc. These esters are comparatively high in molecular weight, contain at least two units of the dibasic acid and the polyhydric alcohol and are very adhesive. Such esters may include the unsaturated alkyds such as ethylene glycol maleate, ethylene glycol fumarate and ethylene glycol itaconate, formed by reaction of ethylene glycol with the unsaturated acid to an advanced state of esterification, for example, to an acid number of 50 or below. They may also include mixed esters in which monohydric alcohols (methyl, ethyl, allyl, methallyl, propyl or tetrahydrofurfuryl alcohol) and/or monobasic acids (acetic, propionic, oleic, stearic acids, etc.) are incorporated in the reaction mixture.

In addition, polyhydric alcohol unsaturated polycarboxylic acid esters formed by reaction of glycol maleate, diethylene glycol fumarate or similar esters having an acid number of 150 or below with a monohydric alcohol such as methyl, benzyl, ethyl or propyl alcohol in amount such that the alcohol introduced exceeds that accountable for by reduction in said number may also be used. Such esters and the preparation thereof are described in United States Letters Patent No. 2,418,633, granted April 8, 1947, to Charles Gould.

Often these polyhydric alcohol esters are found to be unduly viscous per se and, accordingly, impregnation of fibrous bases with such esters is very difficult. In many cases it is found advantageous to blend such esters with less viscous polymerizable liquids, including methyl methacrylate, styrene, vinyl acetate, ethyl itaconate, cyclopentadiene, dicyclopentadiene, indene, methyl alpha chloroacrylate, diallyl or dimethallyl esters including allyl carbonate, allyl phthalate, allyl maleate, allyl fumarate, allyl succinate, allyl adipate, or other corresponding polymerizable unsaturated alcohol polyesters or other compounds including divinyl benzene, glycol dimethacrylate, allyl methacrylate, allyl crotonate, etc. The amount of such diluting polymerizable liquid will be dependent upon the actual viscosity of the glycol ester used and the properties required.

The following classes of polymerizable materials may also be used in accordance with the present invention.

(1) Polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, phenyl propargyl or cinnamyl alcohol and unsaturated acids such as acrylic, methacrylic, alpha or beta chloracrylic, crotonic or cinnamic acids, including allyl acrylate, allyl alpha chloroacrylate, etc.

(2) Polymerizable unsaturated alcohol polyesters of polybasic acids such as phthalic, carbonic, oxalic, succinic, adipic, azalaic, sebacic and terephthalic acids, including diallyl carbonate, diallyl maleate, diallyl fumarate, diallyl oxalate, diallyl adipate, diallyl itaconate, diallyl succinate, ethylene glycol bis (allyl carbonate), diethylene glycol bis (allyl carbonate) and mixtures thereof.

(3) Polyhydric alcohol esters of unsaturated acids such as acrylic, methacrylic, alpha or beta chloracrylic, crotonic, maleic, fumaric, itaconic, etc. and polyhydric alcohols such as ethylene glycol, diethylene glycol, propylene glycol, dipropylene glycol, triethylene glycol, hexaethylene glycol, glycerol, sorbitol and mannitol, including ethylene glycol diacrylate, etc.

(4) Polymerizable ethers including divinyl ether, etc. and copolymers of the ethers and any of the above compounds.

(5) Other organic compounds containing two or more unsaturated, unconjugated groups, including divinyl benzene, divinyl naphthalene, vinyl acetylene, divinyl acetylene, etc.

Other liquid polymerizable or condensible materials capable of curing to a thermosetting state, including glycerol phthalate, liquid phenolaldehyde resins, melamine-aldehyde condensation products and urea condensation products alone or in admixture with the above compounds containing one or more polymerizable groups may also be used in accordance with the present invention.

Liquid compositions which are too fluid for use as such may be partially polymerized or blended with more viscous materials to secure compositions of suitable viscosity. Solid polymerizable compositions may be dissolved in polymerizable liquids or in plasticizers for use as herein contemplated.

The above polymerizable compositions are polymerized with heat and/or light usually in the presence of catalysts such as benzoyl peroxide, acetone peroxide, lauroyl peroxide or methyl ethyl ketone peroxide, as is well-known in the art.

The following examples are given to illustrate this invention further:

*Example I*

A glass fiber mat is sandwiched between two layers of 0.25 inch thick mats of 2.5 denier cellulose acetate fibers 2 inches in length which have been pigmented with an orange pigment during spinning. The whole is impregnated with a catalyzed polymerizable resin prepared in the following manner:

20 moles of maleic anhydride, 2 moles of phthalic anhydride, 22 moles of ethylene glycol and 0.1 percent by weight of hydroquinone were placed in a round bottomed flask equipped with a mercury sealed stirrer, gas inlet and a 6 inch column attached to a Liebig condenser. The system was gas tight. The mixture was heated to 188° C. and heating continued for a period of 6 hours during which time the temperature rose to 220° C. and water was distilled off. Carbon dioxide was bubbled through the reaction mixture to establish a substantially inert atmosphere within the flask. The product thus secured had an acid number of about 115.

6.5 moles of normal propanol was added to the flask and the flask was attached to a reflux condenser which condensed the vapors evolved and returned them to the flask. The mixture was reflux for 6 hours at a temperature gradually rising from 126° to 169° C. During this heating the mixture was agitated and carbon dioxide bubbled through to establish an inert atmosphere.

The product which had an acid number of 90 was heated under reflux for 3 hours with 6 percent by weight of acetic anhydride. The resulting product was topped at a pressure of 2 to 4 mm. of mercury and a temperature of 185–200° C. for 7 hours. The resulting product had an acid number of 35.

70 parts by weight of the liquid obtained was mixed with 30 parts by weight of diallyl phthalate and 3 parts by weight of benzoyl peroxide. This liquid had a viscosity above 500 centipoises.

The impregnated fibrous material is placed in a mold having mating corrugations and held under pressure at an elevated temperature until the polymerization is complete. The product obtained has a uniform orange color. It is also free from protruding fibers, having a smooth even surface, and is resistant to weathering.

*Example II*

A glass fiber mat is sandwiched between two layers of loosely woven fabric of 75 denier regenerated cellulose yarns which had been pigmented during spinning with a bright green coloring material and into which trichlor triethylphosphate has been incorporated as a fire-retardant. The whole is impregnated with the catalyzed polymerizable resin described in Example I to which has been added a room temperature accelerator. The impregnated fibrous materials contained in an envelope of cellophane are placed in a mold having mating corrugations and held under pressure at room temperature until the polymerization is complete. There is obtained a product having a uniform bright green color and a smooth even surface and which is resistant to burning.

*Example III*

A glass fiber mat is sandwiched between two mats of unpigmented cellulose acetate fibers. Yarns of red and blue pigmented 150 denier cellulose acetate are arranged parallel to one another in groups and the groups of yarns are applied to both surfaces of the mats to form a pattern in which the groups of yarns intersect one another. The whole is impregnated with the catalyzed polymerizable resin described in Example I. The impregnated fibrous materials contained between sheets of cellophane are placed between flat aluminum sheets and held under slight pressure at an elevated temperature until the polymerization is complete. There is obtained a product having a decorative pattern of intersecting blue and red stripes. Because of the covering of the glass fiber mats with cellulose acetate mats the surface of the plastic laminate is smooth and even and resistant to weathering.

It is to be understood that the foregoing detailed description is given merely by way of illustration and that many variations may be made therein without departing from the spirit of our invention.

Having described our invention what we desire to secure by Letters Patent is:

1. A plastic laminate comprising a layer of colorless fibrous material, and a pigment-containing fibrous material applied to the surface of said colorless fibrous material, the whole impregnated with a clear polymerized resin, said pigment-containing fibrous material being bonded to said layer substantially solely by said resin.

2. A laminate as set forth in claim 1 in which said colorless fibrous material comprises glass fibers.

3. A laminate as set forth in claim 1 in which said pigment-containing fibrous material is present as a mat.

4. A laminate as set forth in claim 1 in which said pigment-containing fibrous material is present as individual fibers.

5. A laminate as set forth in claim 1, in which said pigment-containing fibrous material is present as a fabric.

6. A laminate as set forth in claim 1 and in which said pigment-containing fibrous material contains a fire retardant.

7. A plastic laminate comprising a layer of colorless glass fibrous material and a pigment-containing cellulose acetate fibrous material applied to the surface of said colorless fibrous material, the whole impregnated with a clear polymerized resin, said pigment-containing fibrous material being bonded to said layer substantially solely by said resin.

8. A laminate as set forth in claim 1 in which said resin is a polymerized unsaturated polyester resin.

9. Process for the production of laminated articles which comprises forming a loose assembly comprising a mat of colorless glass fibers and a mat of fibers of pigment-containing organic thermoplastic material on the surface thereof, impregnating said assembly with a clear liquid polymerizable unsaturated polyester resin, and polymerizing said resin to form a shaped article.

References Cited in the file of this patent

UNITED STATES PATENTS

| | | |
|---|---|---|
| 2,388,184 | Ripper | Oct. 30, 1945 |
| 2,433,727 | Arnold | Dec. 30, 1947 |
| 2,483,404 | Francis | Oct. 4, 1949 |
| 2,489,985 | Speight | Nov. 29, 1949 |
| 2,534,617 | Mohrman | Dec. 19, 1950 |
| 2,688,580 | Fingerhut | Sept. 7, 1954 |
| 2,689,199 | Pesce | Sept. 14, 1954 |